A. E. COOK & T. VAN TUYL.
TRACTOR.
APPLICATION FILED DEC. 6, 1911.
1,180,476.
Patented Apr. 25, 1916.
5 SHEETS—SHEET 1.
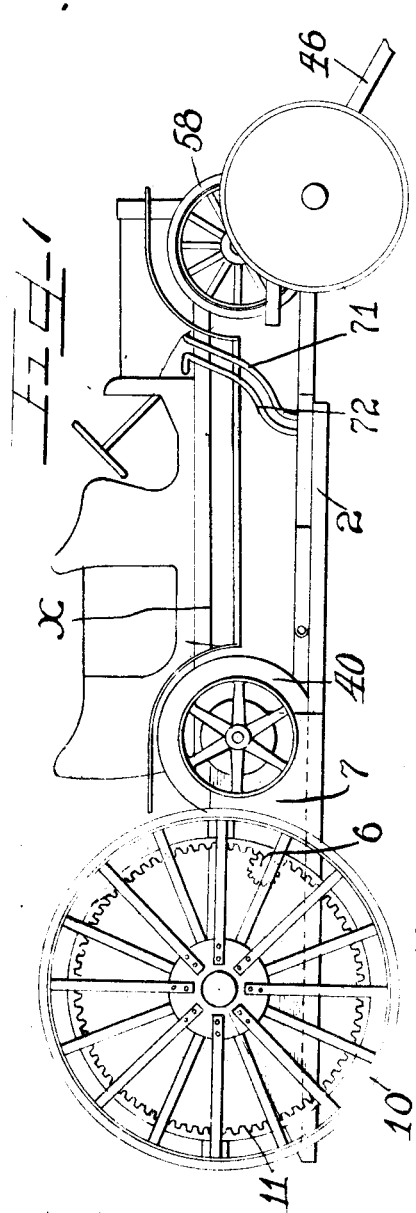
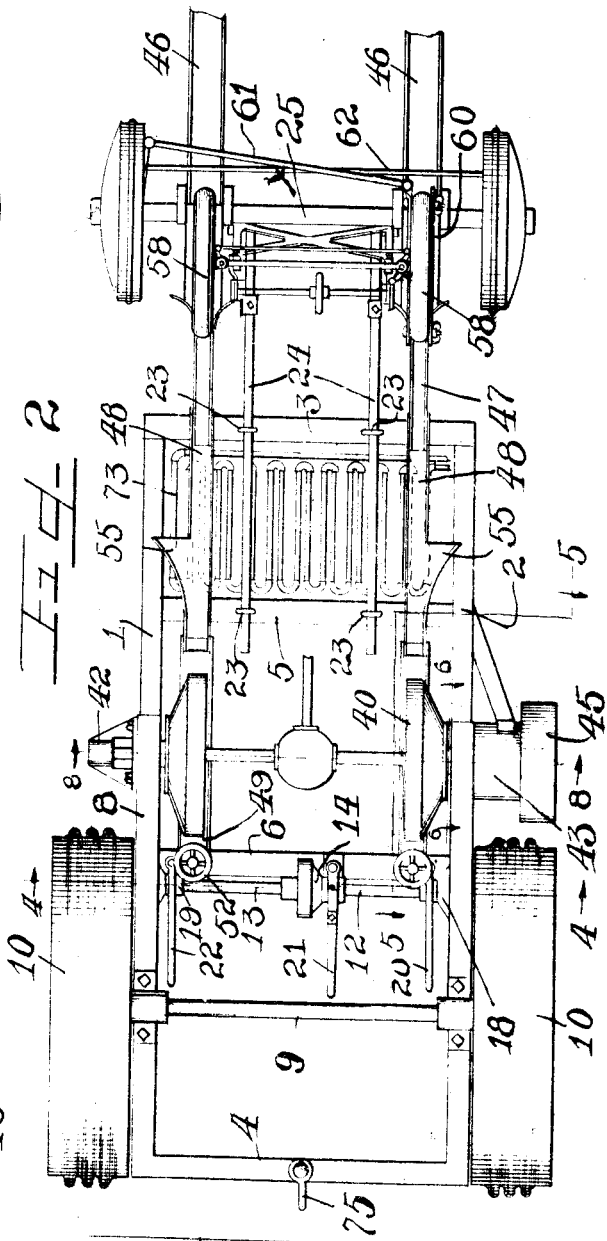

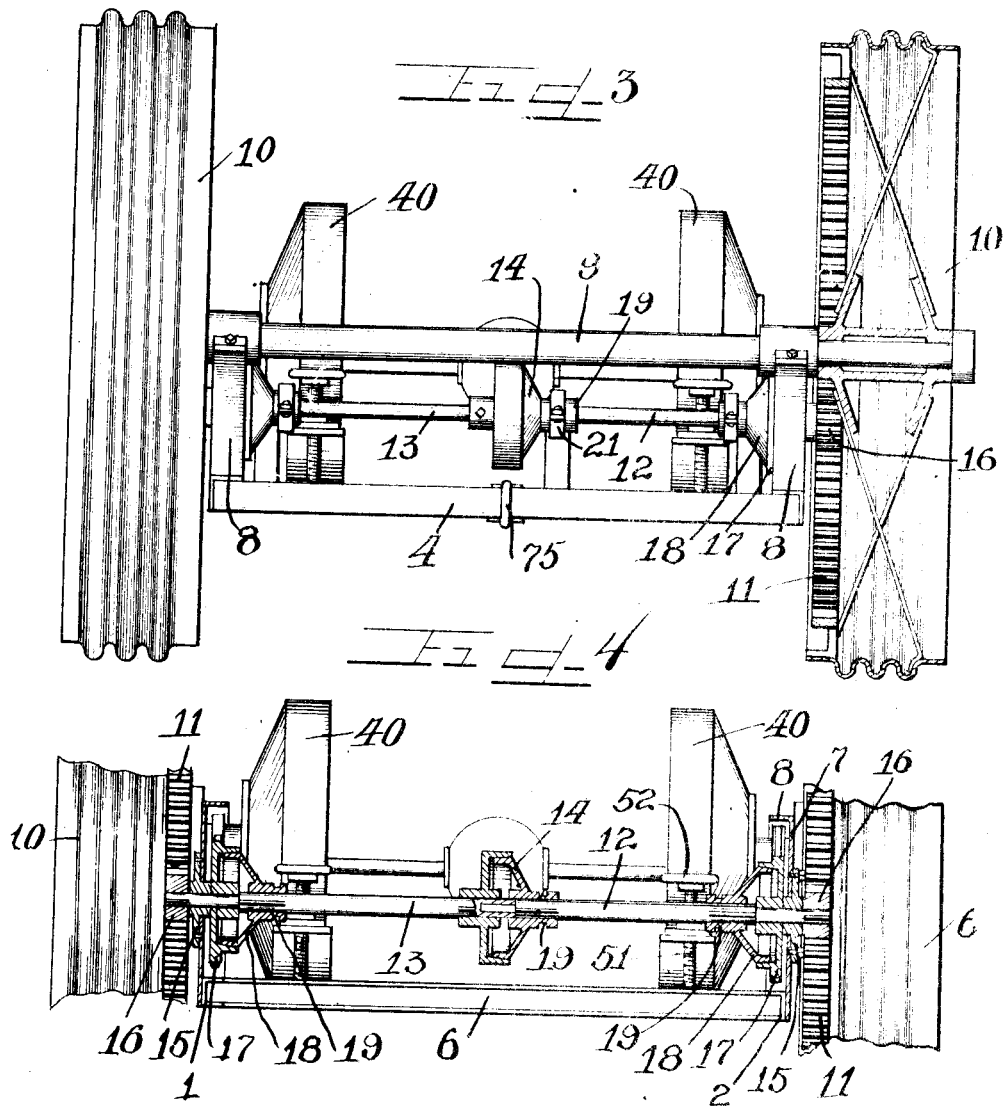

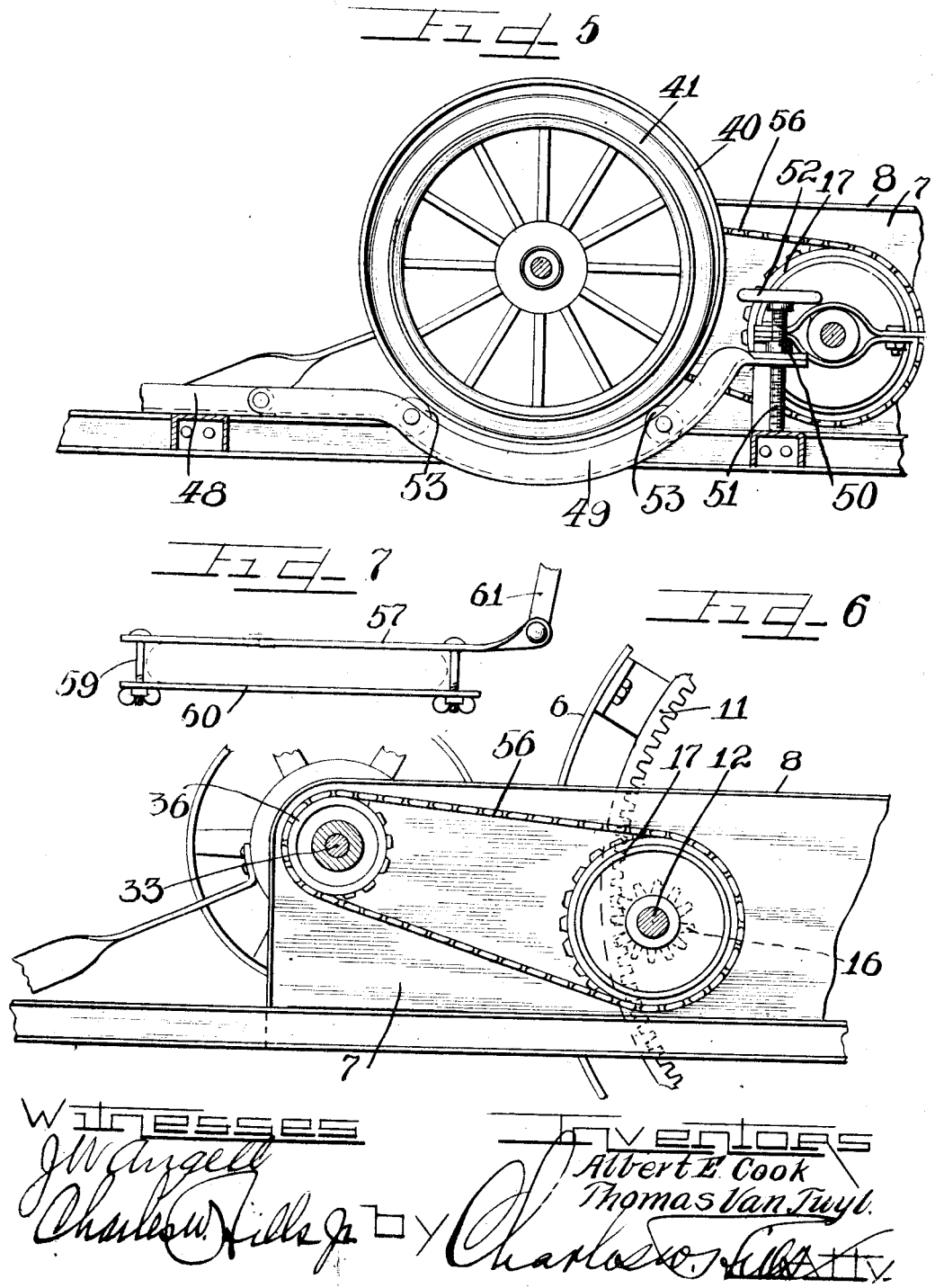

A. E. COOK & T. VAN TUYL.
TRACTOR.
APPLICATION FILED DEC. 6, 1911.
1,180,476.
Patented Apr. 25, 1916.
5 SHEETS—SHEET 4.
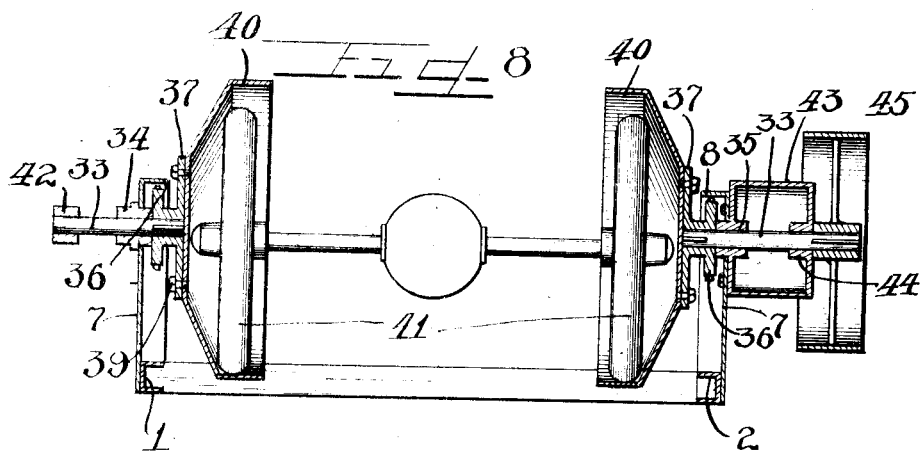
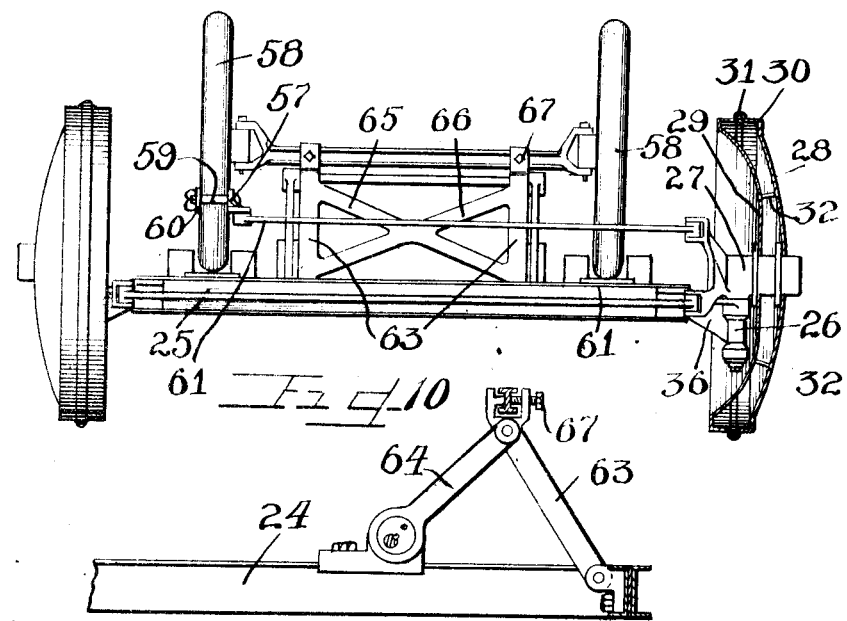
Witnesses
J. W. Angell
Charles W. Hills Jr.
Inventors
Albert E. Cook
Thomas Van Tuyl
By Charles W. Hills
Atty

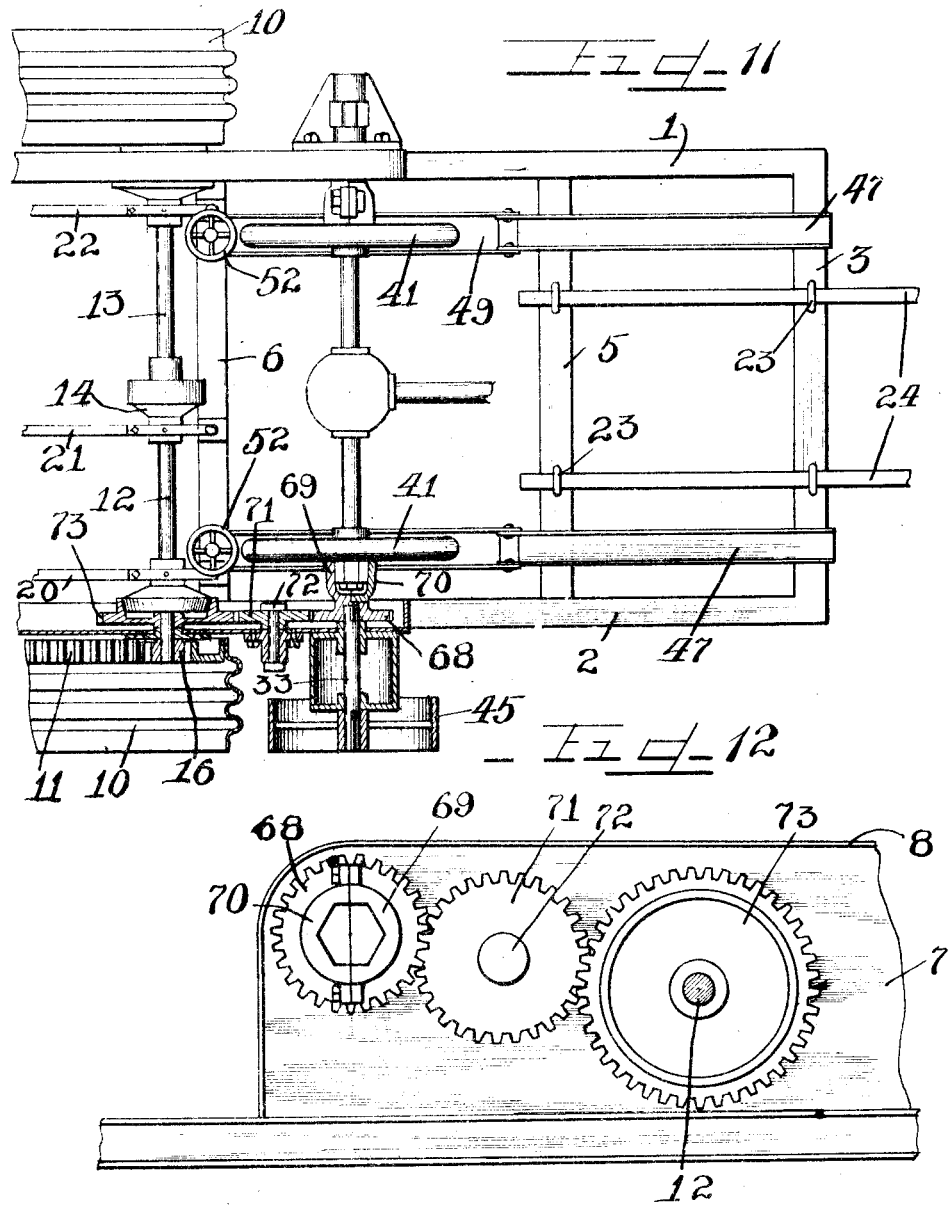

UNITED STATES PATENT OFFICE.

ALBERT E. COOK, OF ODEBOLT, IOWA, AND THOMAS VAN TUYL, OF KANKAKEE, ILLINOIS; SAID VAN TUYL ASSIGNOR TO SAID COOK.

TRACTOR.

1,180,476.  Specification of Letters Patent.  Patented Apr. 25, 1916.

Application filed December 6, 1911. Serial No. 664,161.

*To all whom it may concern:*

Be it known that we, ALBERT E. COOK and THOMAS VAN TUYL, citizens of the United States, and residents of the town of Odebolt, in the county of Sac and State of Iowa, and Kankakee, Kankakee county, Illinois, respectively, have invented certain new and useful Improvements in Tractors; and we do hereby declare that the following is a full, clear, and exact description of the same, reference being had to the accompanying drawings, and to the numbers of reference marked thereon, which form a part of this specification.

This invention relates to improvements in tractors of that class set forth in our prior application for "tractor attachments for automobiles", filed on the 17th day of December, 1910, Serial No. 597,867, and in which the motive power for the tractor is supplied from the power plant of an automobile adapted to be detachably connected with the tractor.

The object of this invention is to afford a tractor of the class described, upon which the automobile may be mounted, and with which the same may be connected to be driven from the power plant of the automobile.

It is also an object of the invention to afford steering connections whereby the ordinary and usual steering gear of the automobile may be utilized in steering the tractor.

It is a further object of the invention to afford a construction whereby the drive of the tractor may be effected by means of the rear or driving wheels of the automobile.

It is an important object of the invention to afford means for securely connecting and supporting the automobile upon the tractor frame in driving position and by means of which the power plant of the automobile may be utilized effectively in driving the machine.

It is also an object of the invention to afford a construction embodying a tractor adapted to be driven by a power plant detachably mounted thereon and also connected to afford a drive independent of the tractor wheels for any desired power purposes to enable the machine to be utilized for general power purposes.

The invention in a preferred form, is illustrated in the drawings and hereinafter more fully described.

In the drawings: Figure 1 is a side elevation of a device embodying our invention. Fig. 2 is a top plan view thereof, with the automobile broken away. Fig. 3 is an enlarged rear elevation of the machine, with one of the tractor wheels in section. Fig. 4 is an enlarged fragmentary section taken on line 4—4 of Fig. 2, and with parts omitted. Fig. 5 is an enlarged, fragmentary detail taken on line 5—5 of Fig. 2. Fig. 6 is an enlarged, fragmentary detail section taken along the line 6—6 of Fig. 2. Fig. 7 is an enlarged, fragmentary detail of the clamp whereby connection is made between one of the front wheels of the automobile and the steering knuckle of the tractor for steering the latter from the former. Fig. 8 is an enlarged section taken on line 8—8 of Fig. 2, with parts omitted, and showing the rear driving wheels and shaft of the automobile in elevation. Fig. 9 is a front elevation, partly in section, of the machine with the automobile in place, and with parts omitted, and illustrating the steering connections. Fig. 10 is an enlarged detail illustrating the construction of the jacks for elevating and supporting the front end of the automobile on the tractor. Fig. 11 is an enlarged, fragmentary detail view partly in plan and partly in section, and illustrating another power connection with the tractor. Fig. 12 is an enlarged section taken alongside the gear train shown in Fig. 11, and with parts omitted.

As shown in the drawings: a strong rectangular frame comprising side members 1 and 2, front and rear transverse members or end sills 3 and 4, and transverse beams 5 and 6, and preferably constructed of structural steel, are rigidly secured together to afford a main frame. Rigidly connected therewith at each side thereof at about the middle of each of the side frame members 1 and 2, are upwardly extending frame plates 7, rigidly secured thereto by riveting, bolting or electric welding, and provided with inwardly directed flanges 8, at the top to stiffen the same. Journaled upon the top flanges 8, of said frame plate 7, is the main transverse tractor shaft 9, having a tractor wheel 10, journaled on each end thereof beyond said frame. Each of said tractor wheels is provided, as shown, with an internal gear 11, for driving the same, and journaled transversely the machine on the webs 7, is a shaft comprising sections 12, and 13, united centrally by means of a suitable coupling 14, affording a releasable clutch to permit both said shaft sections to be driven as one shaft, or permitting either to be driven independently by releasing said clutch member, thus enabling the tractor wheels to drive differentially, if desired. Said shaft sections 12 and 13, extend through said plate or web 7, at each side of the machine and through a suitable bearing 15, secured on said web and at the outer ends thereof are provided with pinions 16, which mesh with the internal gears 11, in the traction wheels.

Rotatably secured on each outer end of each of the shaft sections 12 and 13, is a sprocket wheel 17, having an inwardly directed peripheral flange integral with the inner side thereof and concentric with the shaft, and affording the cup or female member of a cone clutch, and adapted to receive therein the complemental male clutch member 18, slidably but non-rotatably secured on the corresponding ends of said shaft sections 12 and 13. The hub 19, of each of the clutch members on said shaft, is peripherally grooved to receive the yokes of actuating levers 20, 21 and 22, which extend beyond and forwardly of the hubs of said clutch members, and are pivotally engaged on the transverse beam 6, of the frame, while the other or longer ends of said levers extend toward the rear in convenient access for an operator standing upon the rear platform of the machine, thereby enabling an operator at said position driving simultaneously with both tractor wheels, driving with but one tractor wheel, or driving independently with both tractor wheels, as preferred, dependent upon the adjustment of the three clutches before described.

Extending through suitable U bolts 23, in the transverse sills or beams 3 and 5, are structural steel or other suitable bars 24, rigidly secured to the forward ends of which is the front axle 25, of the tractor. Said axle, as shown, has rigidly secured at each end thereof a vertical socket member 26, to receive a steering knuckle 27, on the stub of which is journaled a front tractor wheel. Said front tractor wheel, as shown, (although not necessarily) is constructed of pressed steel or other suitable metal, and comprises an outer convex wall 28, and inner concave wall 29, and a peripheral, relatively flat tread 30, uniting the same and provided with a peripheral tread bead or rib 31. Said outer and inner walls 28 and 29, of the wheel, are spaced suitable distances apart by the tread, by the hub of the wheel, and by stay bolts 32, any desired number of which may be secured therethrough and engaged in place by means of nuts, or may be riveted, as preferred. The hub of the wheel is journaled upon the stub of the axle by means of ball or roller bearings of any preferred form, (but which forms no part of this invention, and are therefore not illustrated). The concavity of the inner side of the wheel is such that the vertical axis upon which the steering knuckle turns, lies at all times in a plane with the middle of the wheel taken through the tread bead or rib 31, thus rendering the turning of the wheel in its plane in steering, very much easier than would otherwise be the case, and likewise greatly reducing the stress upon the steering knuckle due to the weight of the machine as well as to the resistance occasioned in steering.

When the removable power plant for driving the tractor is the power plant of an automobile, as shown, means are provided for moving the automobile into place upon said frame, and affording driving connections between the rear wheels thereof, and the driving shaft comprising the shaft sections 12 and 13. Said driving connections may be of any suitable or preferred kind, conveniently a shaft 33, is journaled in a bearing 34 or 35, secured on said respective webs, and rigidly secured on the inner end of each shaft is a sprocket wheel 36, integral with the inner end of the hub of which is a face plate 37, as shown in Fig. 8, rigidly secured to which by means of bolts or cap screws 39 or other suitable means, are inwardly facing friction members 40, constructed of sheet steel or other suitable material and of a size to receive the rear automobile wheels 41, therein, and to afford a frictional tread surface therefor around the same within the periphery thereof.

As shown in Figs. 5 and 8, the outer end of the shaft sections 33, are rigidly braced at one end, a bracket 42, being rigidly bolted or otherwise secured to the frame and receiving the outer end of said shaft on that side of the machine in a suitable bearing therefor. The bearing 35, at the other side of the machine, as shown, is constructed integrally with a cylindric housing or bracket 43, having a bearing at each end thereof, and having also a bearing 44, at the outer end thereof through which the shaft protrudes and secured on the outer end of said shaft is a pulley 45, adapted to receive a belt for driving other machinery. As shown, the bracket 43, which supports the outer end of said shaft, is cylindric, and may afford a support for the belt when not in use.

A bracket is provided for moving the automobile into place, and comprises, as shown, channeled skids 46, adapted to be engaged on the front axle 25, as shown in Figs. 1 and 2, and in alinement with channeled ways 47, leading rearwardly from the front axle onto the main frame, as shown in Fig. 2, and resting at the rear ends in larger channeled ends 48, which extend rearwardly over the beam 5, and have hinged thereto at their rear ends vertically adjustable channeled way members 49, which are curved somewhat to fit to the periphery of the friction members 40, and at their rear end are engaged on a suitable nut 50, threaded upon a vertical screw shaft 51, having on its upper end a lever or hand wheel 52, whereby the rear end of said section may be elevated as desired, and, as shown, rollers 53, are journaled transversely in said channeled section to bear one at each side the center against the periphery or tread surface of said friction member to support the weight thereof, and the weight of the car when in place in driving position.

Each of the channeled ways 48, is provided with a laterally and forwardly directed branch 55, which permits the friction members, when released from the face plates 37, to be rolled forwardly thereof and inclined at their front edges slightly outward to permit the automobile X, when backed into place, to receive one over each of the rear wheels thereof and to move therewith inwardly into the position shown in Figs. 1, 2 and 5, in which position the rear end of the automobile with said friction members, may be adjusted vertically by means of the screw shaft 51, to permit of again engaging the friction members upon the face plates, as shown in Fig. 8, or in driving position.

In the construction described, sprocket chains 56, are trained about the sprocket wheels 36, on the shaft 33, and about the sprocket wheels 17, before described, the latter, as shown in Fig. 4, being much the larger to reduce the drive of the automobile to the tractor. As shown also, steering connections are provided for steering the tractor by means of the ordinary steering gear of the automobile. For this purpose, as shown in Figs. 2, 7 and 9, a clamp comprising a bar 57, is clamped on the inner side of the front automobile wheel 58, by means of suitable bolts 59, and a corresponding bar 60, parallel to said bar 57, between which the wheel is engaged, as illustrated in dotted lines in Fig. 7, and as shown in Figs. 2 and 3.

A steering rod 61, is pivotally connected with the forwardly extending end of the rod or bar 57, and at its other end is connected with the forwardly directed arm of a steering knuckle for the front tractor wheel, and a connecting rod 62, shown in Fig. 2, connects the other arm of said steering knuckle with the corresponding arm of the tractor wheel, so that the turning of the front automobile wheels when mounted on the tractor, serves also to turn the front tractor wheels correspondingly. To obviate the resistance to such turning due to the weight of the front end of the automobile upon its wheels, a jack is supported upon the front axle 25 of the tractor in position to engage and lift the front axle, of the automobile, so that the wheels thereof may clear the ways therefor. Said jack comprises toggle bars 63 and 64, which are supported upon the bars 24, connecting the front end of the tractor with the main frame. Diagonal braces 65 and 66, on the ends of said toggle bars, hold the same from movement laterally of the tractor frame. Said toggle bars at their articulation are provided with yokes adapted to receive the front axle of the automobile therein, as shown in Figs. 9 and 10, and a set screw 67, affords a clamp for rigidly engaging said automobile axle to prevent any side movement under the steering stresses.

Any suitable means may be provided for actuating the toggle bars to elevate the yoked articulation thereof. For this purpose a screw shaft may be used, as shown in Figs. 9 and 10, although, of course, any suitable means for accomplishing this adjustment may be employed, if desired.

In the construction illustrated in Figs. 11 and 12, a gear wheel 68, is secured on the inner end of the shaft 33, instead of the sprocket wheel before described, and projects inwardly to afford a clamp to engage the hub of the rear automobile wheel. As shown, one half of said clamping member is integral with the gear, as indicated by 69, and the other half 70, thereof is bolted to engage the rear hub of the automobile wheel when backed into place, as shown in Fig. 11. A gear wheel or pinion 71, is secured on a stud shaft 72, in suitable bearings on the web 7, before described, and meshes with the gear 68, and the gear wheel 73, which corresponds with the sprocket wheel 17, before described, and which is integral with the female clutch member before described, at the ends of the shaft sections 12 and 13.

The operation is as follows: In the construction illustrated in Figs. 1 to 10 inclusive, the friction members 40, are released from their face plates and rolled forwardly into the branches 55, of the channeled ways and the automobile is backed into place. As the car is backed into place, the friction members are moved over the rear wheels and moved rearwardly therewith onto the adjustable track section or ways 49, until said friction member rests fairly upon the rollers 53, on said track section. The rear end of the automobile is then adjusted upwardly or downwardly to bring the bolt apertures in the friction members, into register with the bolts therefor in the face plates, and the friction members are rigidly secured in place thereon. The screw shaft is then actuated to elevate the front end of the automobile upon its jack, thus permitting the front wheels to turn freely in steering, and also rigidly securing the machine to the frame. If the radiation of the automobile is insufficient for the service required, suitable hose connections 71 and 72, may be connected with the appropriate ends of a radiating coil 73, supported upon the main frame of the tractor.

If the power of the automobile be now turned on by means of its usual transmission and clutch, it is imparted to the friction members 40, and thence to the jack shaft afforded by the shaft sections 12 and 13, each driving wheel of the automobile driving independently to its appropriate shaft sections through the medium of the clutch thereon. Said clutches communicate the drive to the tractor wheels, and, owing to the difference in size between the driving sprocket wheel and the jack shaft sprocket wheel, a material reduction in the speed of drive is effected. A further reduction is effected through the medium of a small pinion 16, to the internal gear 11, in the respective traction wheels. When driving straight ahead, the central clutch 14, in the jack shaft may be engaged, thus driving the jack shaft sections as one shaft. Where a differential drive is rendered necessary in turning or otherwise, this is effected, of course, by the ordinary differential in the rear axle of the automobile, the central clutch member 14, being disengaged.

Of course, it is understood that, if desired, the front tractor wheels may be omitted, and the front wheels of the automobile may rest upon the ground to serve as the steering wheels for the tractor in a manner illustrated in our prior application for patent before mentioned. Ordinarily, however, such wheels are used where the entire weight of the automobile or other removable power plant is supported wholly upon the tractor.

Of course, after the automobile is mounted in place, the skids 46, are detached from the front end of the machine and laid upon the frame for use when it is desired to remove the automobile from the machine. All the connections described may be very quickly effected, and when the work for which the tractor was required is accomplished, the automobile may be disconnected quickly from the tractor and run down therefrom to be used for other purposes.

In the construction illustrated in Figs. 11 to 13 inclusive, a gear drive is shown instead of a sprocket and chain drive. In this construction, of course, the friction members 40, may be omitted, the automobile wheels are supported upon the rollers 53, as before described, enabling the rear end of the car to be adjusted vertically to facilitate making the desired connections.

It is, of course, to be understood that numerous details of the construction may be varied through a wide range, and it is to be understood that the tractor may be provided with any suitable means, as, for instance, the hook 75, for connecting the tractors or agricultural or other implements therewith to be drawn by the tractor. Any suitable connections may, if desired, be employed to enable the various clutches of the tractor to be actuated from the driver's seat in the automobile. We have shown but one (and that a preferred) construction embodying our invention, and we do not purpose limiting the patent granted on this application otherwise than necessitated by the prior art.

We claim as our invention:

1. A tractor of the class described, an automobile removably mounted thereon and connected to drive the same, and a radiator carried on the tractor and connections between the same and the radiator of the automobile.

2. A tractor of the class described embracing rear driving wheels and front steering wheels, means adjustably connecting the same, ways for mounting an automobile upon said tractor, driving connections between the rear wheels of the tractor and the rear automobile wheels, and steering connections between the front wheels of the tractor and the front wheels of the automobile for steering the tractor from the automobile steering gear.

3. A tractor of the class described, an automobile wholly supported thereon, driving connections between the power plant of the automobile and the driving tractor wheels, and means steering the tractor from the steering gear of the automobile.

4. A tractor of the class described adapted to be driven by an automobile mounted entirely thereon, and connections for steering the tractor from the automobile steering gears.

5. A machine of the class described embracing tractor wheels, a frame supported thereon constructed to receive an automobile removably supported on the frame, and connections between the automobile and the tractor wheels to drive and to steer the tractor by said automobile.

6. A device of the class described embracing tractor wheels, a frame, driving connections on said frame, operatively connected with the tractor wheels to drive the same and embracing hollow friction members, an automobile mounted on said frame with each of its rear wheels within one of said hollow friction members to drive the same frictionally, and clutches disposed in the driving connections for connecting and disconnecting the drive with the tractor wheels.

7. A device of the class described embracing a four wheel tractor and its frame, of an automobile supported on the frame and connected to drive the tractor, means supporting the front wheels of the automobile clear of the tractor frame, and steering connections between the front wheels of the automobile and the front wheels of the tractor.

8. A device of the class described comprising a four wheel tractor, means supporting an automobile thereon, detachable driving drums adapted to receive the rear wheels of the automobile and driven thereby, driving connections between said drums and the wheels of the tractor, and means steering the front wheels of the tractor by means of the front wheels of the automobile.

9. A device of the class described comprising a four wheel tractor, a track thereon to receive an automobile, means elevating the front end of the automobile from the tractor, adjustable friction driving mechanism to receive the rear wheels of the automobile, and driving connections between said mechanism and the tractor wheels.

10. In a device of the class described a four wheel tractor, means supporting an automobile thereon with the front wheels out of contact therewith, connections between the automobile and the tractor wheels to steer the tractor from the automobile, driving drums for the tractor adapted to receive the driving wheels of the automobile, and to transmit the drive to the tractor wheels, and adjustable rollers adapted to support said driving drums on the tractor.

11. In a device of the class described a four wheel tractor adapted to receive an automobile thereon, an extensible frame to vary the wheel base of said tractor, and connections between the tractor and the automobile to drive and steer the former by the latter.

12. A device of the class described comprising a tractor adapted to receive an automobile thereon, steering and driving wheels for the tractor, and mechanisms connecting the steering and driving wheels of the automobile with those of the tractor to operate the latter by means of the former.

13. A device of the class described comprising a four wheel tractor, means varying the distance between the front and rear axles thereof, a frame for said tractor affording a runway for the automobile, means steering said tractor by means of the front wheels of the automobile, and means driving the tractor by means of the driving wheels of the automobile.

14. In a device of the class described a four wheel tractor frame, ways to receive the wheels of an automobile, supported on said tractor frame, an automobile supported on the tractor frame with the wheels thereof in said ways, a hinged section forming a part of said ways, a removable driving friction member, rotatably supported on said hinged section to receive a driving wheel of the automobile therein, and mechanism for transmitting the drive of said removable friction members to the tractor wheels to drive the tractor with the automobile supported thereon.

15. In a device of the class described a frame, tractor wheels supporting the same, the rear wheels thereof adapted to drive and the front wheels to steer the device, means supporting an automobile thereon with the front wheels thereof elevated out of contact with said frame, driving connections adapted to coöperate with the driving wheels of the automobile without rigid attachment thereto, mechanism for adjusting said driving means to properly center the same, and driving connections between the driving wheels of the tractor and said driving means to transmit the drive from the driving wheels of the automobile to said driving tractor wheels.

16. In a device of the class described a tractor frame, tractor wheels supporting the same, means transferring the drive from an automobile supported on said frame to said tractor wheels, an auxiliary watercooling system on said tractor and means connecting the watercooling system of said automobile with that of said tractor to assist in cooling the power plant of said automobile when driving said tractor thereby.

17. In a device of the class described a frame, wheels supporting the same, driving connections for driving certain of the wheels thereof independently and simultaneously, means to receive an automobile wholly mounted upon said frame, mechanisms connected to the driving mechanisms of said tractor to support the rear wheels of the automobile and take off the power therefrom, and means connecting the front wheels of the automobile with the steering wheels of the tractor for steering the tractor by means of the automobile.

In testimony whereof we have hereunto subscribed our names in the presence of two subscribing witnesses.

ALBERT E. COOK.
THOMAS VAN TUYL.

Witnesses:
CHARLES W. HILLS,
CHARLES W. HILLS, Jr.